(12) United States Patent
Choi et al.

(10) Patent No.: US 9,001,910 B1
(45) Date of Patent: *Apr. 7, 2015

(54) SYSTEMS AND METHODS FOR ESTIMATING DECODER NOISE POWER IN OFDM SYSTEMS

(71) Applicant: Marvell International Ltd., Hamilton (BM)

(72) Inventors: Jiwoong Choi, Mountain View, CA (US); Yakun Sun, Sunnyvale, CA (US); Jungwon Lee, San Diego, CA (US); Jianyi Huang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,787

(22) Filed: Apr. 11, 2014

Related U.S. Application Data

(63) Continuation of application No. 13/157,917, filed on Jun. 10, 2011, now Pat. No. 8,699,592.

(60) Provisional application No. 61/354,087, filed on Jun. 11, 2010.

(51) Int. Cl.
*H04K 1/10* (2006.01)
*H04B 7/04* (2006.01)
*H04L 1/00* (2006.01)
*H04L 25/02* (2006.01)

(52) U.S. Cl.
CPC ............ *H04B 7/0413* (2013.01); *H04L 1/0036* (2013.01); *H04L 25/0204* (2013.01)

(58) Field of Classification Search
USPC .......................... 375/260, 142–144, 343, 346
See application file for complete search history.

(56) References Cited

U.S. PATENT DOCUMENTS

| 7,103,316 | B1* | 9/2006 | Hall .............................. 455/63.1 |
| 8,699,592 | B1* | 4/2014 | Choi et al. .................... 375/260 |
| 2001/0012317 | A1* | 8/2001 | Jin et al. ........................ 375/148 |
| 2003/0153322 | A1* | 8/2003 | Burke et al. .................. 455/450 |
| 2004/0120411 | A1* | 6/2004 | Walton et al. ................. 375/260 |
| 2005/0069023 | A1 | 3/2005 | Bottomley et al. |
| 2005/0169412 | A1 | 8/2005 | Yang et al. |
| 2006/0067395 | A1 | 3/2006 | Hafeez |
| 2006/0109936 | A1 | 5/2006 | Ouvry et al. |
| 2007/0165755 | A1 | 7/2007 | Jong |
| 2008/0019331 | A1 | 1/2008 | Thomas et al. |
| 2009/0245333 | A1 | 10/2009 | Krishnamoorthi et al. |
| 2010/0002812 | A1 | 1/2010 | Steele et al. |
| 2011/0026653 | A1 | 2/2011 | Luo et al. |
| 2011/0051618 | A1 | 3/2011 | Li et al. |

OTHER PUBLICATIONS

Choi, et al., "Design of a Channel-Aware OFDM Transceiver," IEEE Transactions on Wireless Communications, 6:5, May 2007, pp. 1813-1822.

* cited by examiner

*Primary Examiner* — Emmanuel Bayard

(57) ABSTRACT

Systems and methods for computing a decoder noise power estimate are provided. A pilot signal transmitted through a fading channel from a wireless transmission source is received. Signal power of the received pilot signal, channel noise power, and channel estimation error are computed. The decoder noise power estimate is determined based on the computed signal power, channel noise power, and channel estimation error.

20 Claims, 3 Drawing Sheets

SYSTEMS AND METHODS FOR ESTIMATING DECODER NOISE POWER IN OFDM SYSTEMS

CROSS-REFERENCE TO RELATED APPLICATION

This application is a continuation of U.S. patent application Ser. No. 13/157,917, filed Jun. 10, 2011 (now U.S. Pat. No. 8,699,592), which claims the benefit under 35 U.S.C. §119(e) of U.S. Provisional Application No. 61/354,087, filed Jun. 11, 2010, each of which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Conventional systems determine a decoder noise power estimate based on finite impulse response (FIR) filtering, such as 3-tap frequency-domain filtering or time-domain filtering. These conventional systems neglect to consider channel estimation error and are effective when the decoder noise power is equal or similar to the channel noise power. However, such estimation is ineffective for determining the decoder noise power estimate when the decoder noise power is not equal or similar to the channel noise power, such as in recent wireless transmission systems where the channel estimation error is not negligible.

SUMMARY

In view of the foregoing, systems and methods for estimating decoder noise power in accordance with various embodiments of the present disclosure are provided.

In some embodiments, a pilot signal transmitted through a fading channel from a wireless transmission source is received. Signal power of the received pilot signal, channel noise power, and channel estimation error are computed. The decoder noise power estimate is determined based on the computed signal power, channel noise power, and channel estimation error. In some implementations, the pilot signal is an orthogonal frequency division multiplexing (OFDM) signal.

In some embodiments, the channel estimation error is computed based on a channel estimation filter, such as a finite impulse response (FIR) channel estimation filter. In some embodiments, the channel estimation error is computed by computing a channel estimation error for each of a plurality of pilot data points.

In some embodiments, a plurality of channel estimation errors in a plurality of domains are computed separately. The channel estimation error that indicates a smaller deviation from a measured decoder noise power is used to determine the decoder noise power estimate. In some implementations, each of the plurality of domains is a time-domain, a frequency-domain, or a time- and frequency-domain. In some implementations, the plurality of channel estimation errors are computed using a plurality of channel estimation filters.

In some embodiments, multiple channel estimation errors are computed separately. Multiple decoder noise power estimates are computed based on the multiple channel estimation errors. A deviation value is determined for each of the estimates based on a comparison of the estimate and a measured decoder noise power. The estimate having the smallest deviation value is selected as the decoder noise power estimate. In some implementations, multiple channel estimation errors are computed using multiple channel estimation filters associated with different subsets of pilot data points.

DETAILED DESCRIPTION

The present disclosure generally relates to computing decoder noise power estimates based on a computed channel estimation error. In particular, signal power, channel noise power, and channel estimation error are computed for a pilot signal transmitted through a wireless channel. The decoder noise power estimate is determined based on the signal power, the channel noise power, and the channel estimation error that indicates less deviation from a measured decoder noise power.

Figure 1:
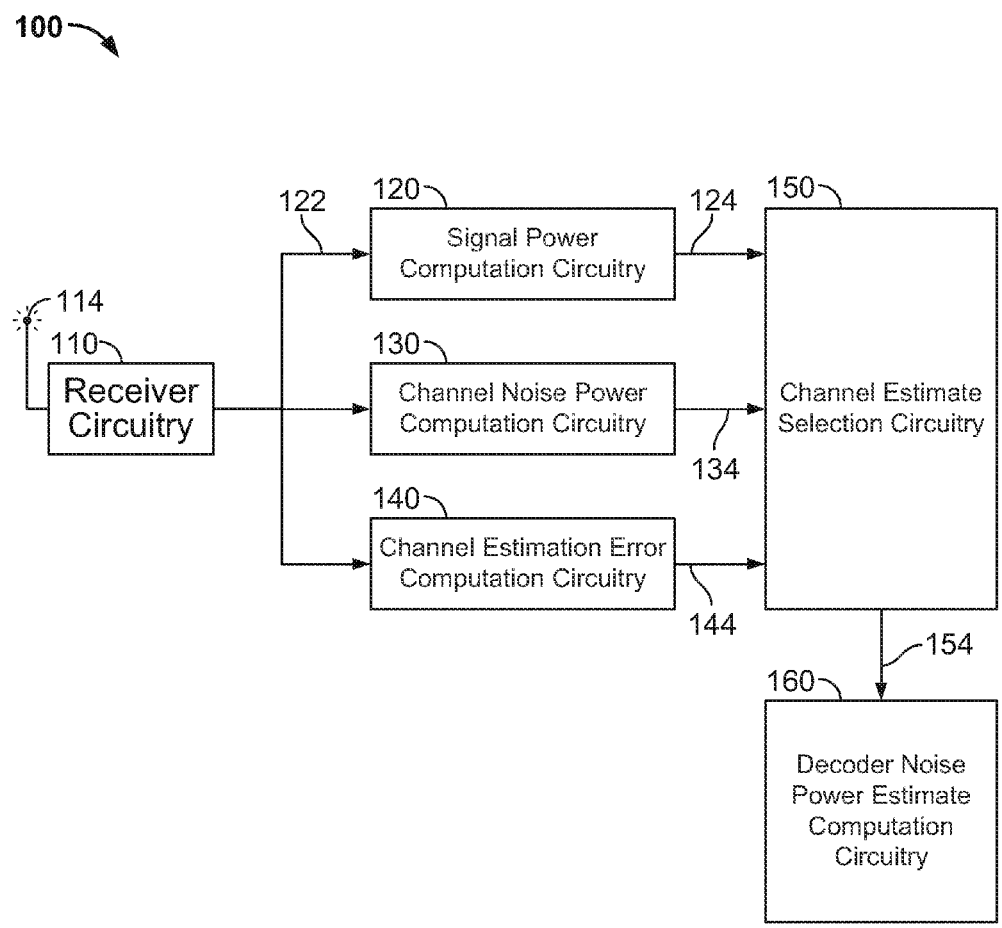
FIG. 1 shows an illustrative decoder noise power estimation system in accordance with an embodiment of the present disclosure.

FIG. 1 shows an illustrative decoder noise power estimation system 100 in accordance with an embodiment of the present disclosure. System 100 includes receiver circuitry 110, signal power computation circuitry 120, channel noise power computation circuitry 130, channel estimation error computation circuitry 140, channel estimate selection circuitry 150, and decoder noise power estimate computation circuitry 160.

The components shown in FIG. 1 may be implemented by a single integrated circuit (IC) or as separate components in a circuit board or implemented on a programmable logic device. In some implementations, the components shown in FIG. 1 may include various analog or digital processing circuitries. For example, one or more of circuitries 110, 120, 130, 140, 150, and 160 may be a digital signal processor or a microprocessor. In some implementations, components shown in FIG. 1 may include transmitter/receiver circuitry. In some embodiments, the components shown in FIG. 1 may be implemented on separate devices or circuits and networked together. For example, components shown in FIG. 1 may communicate via communication links 122, 124, 134, 144, and 154, each of which may be any wired or wireless path or combinations of the same.

Receiver circuitry 110 may include circuitry necessary for receiving a signal over a high or low frequency communications channel using one or more antennas 114. For example, receiver circuitry 110 may include an encoder, decoder, analog-to-digital converter (ADC), digital-to-analog converter (DAC), one or more analog and/or digital filters, one or more equalizers, modulators, power amplifiers and any other suitable component necessary to receive a data and/or pilot signal over a high or low frequency wireless communications medium. The presented disclosure applies to OFDM systems equipped with multiple transmit and receive antennas. Hereafter a single transmit antenna single receive antenna model is presented for simplicity. The received signal model in orthogonal frequency division multiplexing (OFDM) systems is represented in accordance with equation (1) below:

$$Y_m[k] = \sqrt{B} X_m[k] H_m[k] + Z_m[k] \quad (1)$$

where $Y_m[k]$ is the received signal, m is a time index, k is a frequency index, B is the boosting power of the pilot signal and may be a predetermined value, $X_m[k]$ is the pilot signal (or data signal), $H_m[k]$ is the channel gain, $Z_m[k]$ is the noise (and interference) signal, which can be approximated as zero mean additive white Gaussian noise (AWGN) with variance $\sigma_Z^2$ (e.g., $C(0, \sigma_Z^2)$).

In some implementations, pilot signal $X_m[k]$ is an OFDM training signal transmitted at regular intervals. The pilot signal may include a preamble with a reference to allow receiver circuitry 110 to identify the originally transmitted values. This allows receiver circuitry 110 to determine the transmitted signal unaffected by the communications channel. In some implementations, the pilot signal is spaced by $N_t$ symbols in time and $N_f$ subcarriers in frequency, respectively. The pilot signal may be scattered in multiple dimensions.

Receiver circuitry 110 may provide the received signal $Y_m[k]$ as well as the expected signal $X_m[k]$ to signal power computation circuitry 120, channel noise power computation circuitry 130, and channel estimation error computation circuitry 140 over communications link 122. Although FIG. 1 shows only three different circuitries for computing signal power, channel noise power, and channel estimation error, any number of additional circuitries may be provided to compute signal power, noise power, channel estimation error, or any other suitable parameter. For example, a fourth circuitry may be added and coupled to communications link 122 to compute channel estimation error using a different channel estimation filter. As discussed in more detail below in connection with FIG. 2, the signal computation may differ from the channel noise power computation and the channel estimation error computation. In particular, the channel estimation (CE) filter for the signal power computation may differ from that used for the channel noise power computation and the channel estimation error computation.

Signal power computation circuitry 120 may compute characteristics of the received signal, such as signal power, correlation, or any other suitable characteristic. The output of signal power computation circuitry 120 is referred as signal power which can be any suitable signal characteristic. In some embodiments, signal power computation circuitry 120 may compute the signal power of the received signal in the time-domain, the frequency-domain, or a combination of the time-domain and the frequency-domain. Similarly, channel noise power computation circuitry 130 and channel estimation error computation circuitry 140 may compute the channel noise power and the channel estimation error in the time-domain, the frequency-domain, or a combination of the time-domain and the frequency-domain. The domain used for computing the signal power in circuitry 120 may be the same as, or different from, the domains used for computing the channel noise power and channel estimation error in circuitry 130 and circuitry 140, respectively. For example, signal power computation circuitry 130 may compute the signal power of the received signal in the frequency-domain while channel noise power computation circuitry 130 and channel estimation error computation circuitry 140 compute the channel noise power and the channel estimation error, respectively, in a time- and frequency-domain. In general, the domain may include any combination of frequency, time, and time and frequency for the signal power computation, channel noise power computation, and/or channel estimation error computation. Various systems and methods for computing signal and noise power in multiple domains are discussed in, for example, Choi, U.S. patent application Ser. No. 12/775,850, filed May 7, 2010, which is hereby incorporated by reference herein in its entirety.

Although the signal power computation, channel noise power computation, and channel estimation error computation are shown as being computed in parallel using circuitries 120, 130, and 140, each signal power, channel noise power, and channel estimation error may be computed sequentially using a single circuitry or processor. For example, the signal power and channel noise power may be computed and the values of the signal power and channel noise power may be stored in a memory. The channel estimation error may subsequently be computed using the same or different circuitry and the value of the channel estimation error may be stored at a different location in the memory. As discussed in more detail below in connection with FIG. 2, multiple channel estimation errors may be computed in multiple domains using the same or different circuitry and the value of these channel estimation errors may be stored at a different location in the memory. The values of the signal power, channel noise power, and one or more channel estimation errors may be retrieved from the memory and provided to channel estimate selection circuitry 150 over communications links 124, 134, and 144 for further processing.

In some embodiments, signal power computation circuitry 120 may provide the computed signal power through communications link 124 to channel estimate selection circuitry 150. Channel noise power computation circuitry 130 may provide the computed channel power through communications link 134 to channel estimate selection circuitry 150. Channel estimation error computation circuitry 140 may provide the computed channel estimation error through communications link 144 to channel estimate selection circuitry 150.

Channel estimate selection circuitry 150 processes the signal power, channel noise power, and channel estimation error received over communication links 124, 134, and 144 to determine which of the subsets of pilot data points indicate a smaller deviation from a measured decoder noise power. For example, channel estimate selection circuitry 150 may determine that there exists less deviation from the measured decoder noise power in a time- and frequency-domain that includes a subset of three pilot data points that span three discrete temporal locations and three discrete frequencies. Accordingly, channel estimate selection circuitry 150 may select the channel estimation filter that corresponds to the smaller channel estimation error received over communication links 124, 134, and 144. The channel estimate selected by channel estimate selection circuitry 150 is provided over communications link 154 to decoder noise power estimate computation circuitry 160. Channel estimate selection circuitry 150 is discussed in more detail below in connection with FIG. 2.

In some embodiments, channel estimate selection circuitry 150 may compute decoder noise power estimate value for a plurality of channel noise powers and channel estimation errors received over communication links 134 and 144. For example, channel estimate selection circuitry 150 may compute a first decoder noise power estimate corresponding to a first domain (e.g., a first subset of pilot data points, a first channel estimation filter) based on a first set of signal power, channel noise power, and channel estimation error that channel estimate selection circuitry 150 receives from circuitries 120, 130, and 140. Similarly, channel estimate selection circuitry 150 may compute a second decoder noise power estimate corresponding to a second domain (e.g., a second subset of pilot data points, a second channel estimation filter) based on a second set of signal power, channel noise power, and channel estimation error that channel estimate selection circuitry 150 receives from circuitries 120, 130, and 140. Channel estimate selection circuitry 150 may compare the first decoder noise power estimate value and the second decoder noise power estimate value to the measured decoder noise power and select the channel estimation filter that corresponds to the smaller deviation value from the measured decoder noise power. In certain embodiments, channel estimate selection circuitry 150 may compute and compare multiple decoder noise power estimates based on multiple channel estimation filters in multiple domains using iterative, feedback (e.g., using a threshold value), or parallel computation methods.

Figure 2:
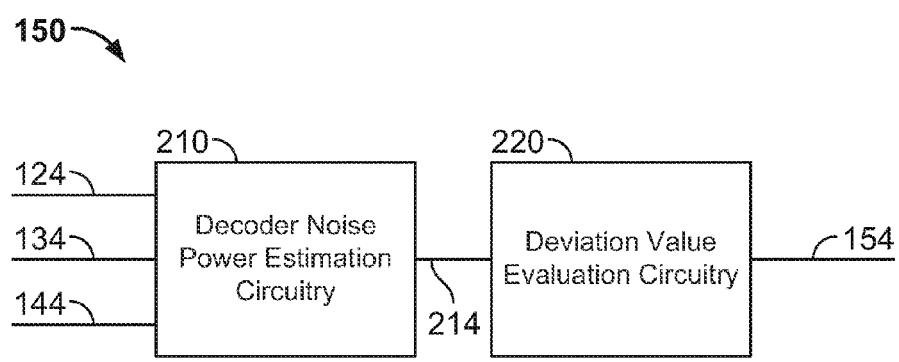
FIG. 2 shows an illustrative channel estimate selection circuitry in accordance with an embodiment of the present disclosure.

FIG. 2 shows an illustrative channel estimate selection circuitry 150 in accordance with an embodiment of the present disclosure. Channel estimate selection circuitry 150 includes decoder noise power estimation circuitry 210 and a deviation value evaluation circuitry 220.

In some implementations, decoder noise power estimation circuitry 210 may represent the channel $H_m[k]$ as an estimated channel $\hat{H}_m[k]$ in accordance with equation (2):

$$\hat{H} = H + \epsilon_H \quad (2)$$

where $\epsilon_H$ is the channel estimation (CE) error associated with channel estimate $\hat{H}$. The mean squared error (MSE) of the channel estimate $\sigma_e^2$ is calculated in accordance with equation (3):

$$\sigma_e^2 = E\{|\epsilon_H|^2\}$$

$$= E\{|\hat{H} - H|^2\} \quad (3)$$

where $E\{X\}$ denotes the expectation of X. Channel estimation error $\epsilon_H$ occurs due to channel distortion and residual noise after noise suppression. It will be understood that both noise and interference will be referred to as "noise" hereinafter.

Decoder noise power estimation circuitry 210 may represent the MSE of the channel estimate $\sigma_e^2$ as a function of the channel estimation filter, the channel spectrum, and the variance of the noise (and interference) signal $\sigma_z^2$ for a channel estimate employing a finite impulse response (FIR) filter. For example, the MSE of the channel estimate $\sigma_e^2$ is calculated using a Taylor series approximation in accordance with equation (4) for an equal-coefficient FIR filter:

$$\sigma_e^2 \approx \left(1 + \frac{1}{M_t M_f}\right)\sigma_s^2 + \frac{N_t N_f}{576} P_s \left(2(M_t^2 N_t^2)(M_f^2 N_f^2)\overline{w}_t^{(2)}\overline{w}_f^{(2)} + (M_t^2 N_t^2)^2 \overline{w}_t^{(4)} + (M_f^2 N_f^2)^2 \overline{w}_f^{(4)}\right) \quad (4)$$

where $M_t$ is the time tap-size of the FIR channel estimation filter, $M_f$ is the frequency tap-size of the FIR channel estimation filter, $N_t$ is the number of taps in the time domain ($N_t = 2M_t + 1$), $N_f$ is the number of taps in the frequency domain ($N_f = 2M_f + 1$), $P_s$ is the signal power of the pilot signal, $\overline{w}_t^{(n)}$ is the n-th order moment of the Doppler spectrum, and $\overline{w}_f^{(n)}$ is the n-th order moment of the power delay profile. Equation (4) corresponds to a fourth-order Taylor series approximation in which the number of taps in the time and frequency domains are much greater than one ($N_t, N_f \gg 1$) and the effect of higher order terms is assumed to be negligible. The moments $\overline{w}_t^{(n)}$ and $\overline{w}_f^{(n)}$ may be represented as functions of the channel Doppler spectrum $S_{H_t}(w)$ and the channel power delay profile $S_{H_f}(w)$, respectively, in accordance with equations (5) and (6) below:

$$\overline{w}_t^{(n)} = \frac{1}{2\pi} \int_{-\pi}^{\pi} w^n S_{H_t}(w) dw \quad (5)$$

$$\overline{w}_f^{(n)} = \frac{1}{2\pi} \int_{-\pi}^{\pi} w^n S_{H_f}(w) dw \quad (6)$$

Decoder noise power estimation circuitry 210 may perform demodulation with channel compensation in accordance with equation (7) below:

$$\hat{H}^H Y = (H + \epsilon_H)^H (HX + Z)$$

$$\approx H^H H X + H^H Z + \epsilon_H^H H X \quad (7)$$

where $X^H$ denotes the conjugate transpose of X and double noise (and interference) terms have been neglected. Omitting the common term $H^H$ or H having the same absolute value, signal power, channel noise power $\sigma_{z,ch}^2$, and decoder noise power $\sigma_{z,de}^2$ can be represented in accordance with equations (8)-(10), respectively:

$$P_s = E\{|HX|^2\}; \quad (8)$$

$$\sigma_{z,ch}^2 = E\{|Z|^2\} = \sigma_z^2; \quad (9)$$

and $$\sigma_{z,de}^2 = E\{|Z + \epsilon_H^H X|^2\} = \sigma_z^2 + E\{|\epsilon_H^H X|^2\}. \quad (10)$$

The channel noise power represents the noise power at the medium or at the receiver with negligible channel estimation error and is used for blocks that use noise power at the channel (i.e., medium). The decoder noise power represents the noise power that a detector effectively experiences at data locations, and is a function of the signal power, the channel estimation filter, the channel condition, and the channel noise power. The decoder noise power estimate is used for blocks that use effective noise power information, such as for multiple-input and multiple-output (MIMO) detection, log-likelihood ratio normalization, channel quality information (CQI), and pre-coding decisions.

In certain embodiments, such as in wireless communication systems, the computation of a decoder noise power estimate allows for the proper recovery of the received signal. Decoder noise power estimation circuitry 210 represents the decoder noise power estimate of equation (10) as a summation of the channel noise power and the normalized channel estimation error variance in accordance with equation (11):

$$\sigma_{z,de}^2 = \sigma_z^2 + E\{|\epsilon_H^H X|^2\} \approx \sigma_z^2 + \sigma_e^2 P_s \quad (11)$$

Decoder noise power estimation circuitry 210 may compute the decoder noise power estimate using a direct computation method, an indirect computation method, or both. For example, decoder noise power estimation circuitry 210 may compute the decoder noise power estimate using a direct method that uses the decoder noise power measured at the data locations of the received signal in accordance with equation (12):

$$\hat{P}_{Z,de,data} = E\{|Y_{m_d}[k_d] - X_{m_d}[k]\hat{H}_{m_d}[k]|^2\}$$

$$= E\{|Z_{m_d}[k_d] - \epsilon_{H,m_d}[k]X_{m_d}[k]|^2\}$$

$$\approx \hat{P}_{z,de} = \sigma_z^2 + \sigma_e^2 P_s \quad (12)$$

where $m_d$ is the time index of the data signal, $k_d$ is the frequency index of the data signal, $\hat{H}_{m_d}[k]$ is the channel estimation filter output (obtained using adjacent pilot data points), $X_{m_d}[k]$ is the data signal, $Z_{m_d}[k_d]$ is the channel noise, and $\epsilon_{H,x_d}[k]X_{m_d}[k]$ is the channel estimation error term. If the data signal $X_{m_d}[k]$ is pre-known or available after successful decoding, decoder noise power estimation circuitry 210 may compute the decoder noise power estimate by calculating equation (12) at the data locations because the channel noise $Z_{m_d}[k_d]$ and the channel estimation error term $\epsilon_{H,m_d}[k]X_{m_d}[k]$ are independent of each other. However, in certain embodiments this may not be practical if the received data signal $X_{m_d}[k]$ is not known, there is a non-zero data decoding error, and/or the decoding latency is too large.

In certain embodiments, decoder noise power estimation circuitry 210 may compute the decoder noise power estimate using a direct method that uses the decoder noise power measured at the pilot locations of a received pilot signal in accordance with equation (13):

$$\hat{P}_{Z,de,data} = E\{|Y_{m_p}[k_p] - X_{m_p}[k]\hat{H}_{m_p}[k]|^2\}$$

$$= E\{|Z_{m_p}[k_p] - \epsilon_{H,m_p}[k]X_{m_p}[k]|^2\} \quad (13)$$

where $m_p$ is the time index of the pilot signal, $k_p$ is the frequency index of the pilot signal, $\hat{H}_{m_p}[k]$ is the channel estimation filter output, $X_{m_p}[k]$ is the pilot signal, $Z_{m_p}[k_p]$ is the channel noise, and $\epsilon_{H,m_p}[k]X_{m_p}[k]$ is the channel estimation error term. Decoder noise power estimation circuitry 210 may use the direct computation method of equation (13) instead of the direct computation method of equation (12) if the decoder noise power measured at the pilot locations is similar or equal to the decoder noise power measured at the data locations ($\hat{P}_{z,de,pilot} \approx \hat{P}_{x,de,data}$). If the decoder noise power measured at the pilot locations is not equal or similar to the decoder noise power measured at the data locations ($\hat{P}_{z,de,pilot} \neq \hat{P}_{z,de,data}$), then the decoder noise power may be difficult to compute because $\epsilon_{H,m_d}[k]X_{m_d}[k]$ depends on $Z_{m_d}[k_d]$ as illustrated in equation (14):

$$\hat{P}_{Z,de,pilot} = E\{|(1-\alpha)Z_{m_p}[k_p] - \epsilon'_{H,m_p}[k_p]X_{m_p}[k_p]|^2\}$$

$$\approx (1-\alpha)^2\sigma_z^2 + \sigma_e^2 P_S \quad (14)$$

where:

$$\epsilon_{H,m_p}[k_p] = \alpha Z_{m_p}[k_p]/X_{m_p}[k_p] + \epsilon'_{H,m_p}[k_p]; \quad (15)$$

$\alpha$ is the filter coefficient for pilot data point at $(m_p,k_p)$ (i.e., $\alpha$ depends on CE filter); and $$\sigma_e^2 P_S = E\{|\epsilon'_{H,m_p}[k_p]x_{m_p}[k_p]|^2\}$$

$$= E\{|\epsilon_{H,m_p}[k_p]x_{m_p}[k_p] - \alpha z_{m_p}[k_p]|^2\}$$

When $\alpha$ is small (i.e., near zero), the decoder noise power measured at the pilot locations is equal or similar to the decoder noise power ($\hat{P}_{z,de,pilot} \approx \hat{P}_{z,de}$) since the channel estimation error due to the use of the pilot points instead of the data points is small (i.e., negligible). However, it may be difficult to make the decoder noise power measured at the pilot locations equal or similar to the decoder noise power for a non-small $\alpha$ (e.g., $\alpha = 1/3, 1/5$) or as $\alpha$ approaches unity (e.g., $\hat{P}_{z,de,pilot} = 0$ when $\alpha = 1$). Therefore, the direct computation method of equation (13) is applicable when $\alpha$ is small. However, in certain embodiments the direct computation method of equation (13) may not be practical because the interpolation effect for the data locations may not be properly reflected since equation (13) only considers the pilot data locations. Furthermore, it may be necessary for decoder noise power estimation circuitry 210 to store (e.g., in memory) the received signal Y until the channel estimation filter output $\hat{H}$ is available (i.e., after channel estimation processing), which may increase decoder latency.

In certain embodiments, such as more general or simpler implementations, decoder noise power estimation circuitry 210 may use an indirect computation method for decoder noise power estimation. As illustrated by equation (11), it may be difficult to directly calculate the MSE of the channel estimate $\sigma_e^2$ since $\sigma_e^2$ is a complicated function of channel estimation filter parameters, the channel fading condition, and the channel's signal to noise power ratio ($P_s/\sigma_z^2$). Furthermore, as illustrated by equation (4), the MSE of the channel estimate $\sigma_e^2$ increases proportionally as the channel fading becomes faster and more frequency selective (i.e., increased $\overline{w}_t^{(n)}$ and $\overline{w}_f^{(n)}$). Decoder noise power estimation circuitry 210 may indirectly calculate the MSE of the channel estimate $\sigma_e^2$ using FIR filtering with a proper selection of the pilot set to make equality (a) in equation (17) valid (i.e., $\beta_z \approx \sigma_e^2$):

$$\hat{P}_Z = \eta_Z \frac{\sum_{m=0}^{N_S-1} \sum_{\kappa \in P_Z} |Y_m[k] - X_m[k]\hat{H}_m[k]|^2}{N_S N_P} \quad (17)$$

$$\approx \sigma_S^2 + \beta_z P_o$$

$$\overset{(a)}{\approx} \sigma_z^2 + \sigma_e^2 P_\varepsilon$$

where $\eta_z$ is the scaling factor, $\beta_z$ is a residual term which depends on channel estimation filter and the channel condition, $N_s$ is the number of pilot symbols, $N_p$ is the number of pilot subcarriers, $P_m$ is the set of pilot subcarriers, and $\hat{H}_m[k]$ is a weighted sum of adjacent received pilots. Decoder noise power estimation circuitry 210 may represent the channel estimate $\hat{H}_m[k]$ in accordance with equation (18):

$$\hat{H}_m[k] = \sum_{m_p,k_p} g(m_p, k_p)\hat{H}_{m+m_p}[k+k_p] \quad (18)$$

where $\hat{H}_m[q]$ is the channel estimate at the instant of pilot symbol transmission ($\hat{H}_m[q] = Y_m[q]/X_m[q]$), $m_p$ is the time index of the pilot symbol, $k_p$ is the subcarrier (frequency) index of the pilot symbol, and $g(m_p,k_p)$ is the coefficient of the pilot symbol.

Channel estimate selection circuitry 150 selects the pilot data set that makes the residual term $\beta_z$ similar or equal to the MSE of the channel estimate $\sigma_e^2$. In some implementations, decoder noise power estimation circuitry 210 may consider various subsets of the number of pilot data points and pilot patterns to compute the decoder noise power estimate. For example, decoder noise power estimation circuitry 210 may use frequency-domain FIR filtering followed by time-domain FIR filtering to compute a decoder noise power estimate for a downlink long term evolution (LTE) OFDM system. Decoder noise power estimation circuitry 210 may also determine the number of pilot data points and their coefficients (i.e., $g(m_p, k_p)$ in equation (17)). Any suitable type of pilot selection can be considered if it can properly track the decoder noise power ($\beta_z \approx \sigma_e^2$) for a given channel estimation method, system configuration, and channel condition.

Channel estimate selection circuitry 150 may determine which domain or channel estimate leads to a decoder noise power estimate that has the least channel estimation error or the least deviation from a measured decoder noise power. In some implementations, channel estimate selection circuitry 150 may include deviation value evaluation circuitry 220 to evaluate the decoder noise power estimates computed using one or more of the various methods described herein. In some implementations, deviation value evaluation circuitry 220 may include a comparator circuit (e.g., op-amp and/or a subtraction circuitry).

In some implementations, deviation value evaluation circuitry 220 receives a first decoder noise power estimate based on a first channel estimate from decoder noise power estimation circuitry 210 through communication link 214. Similarly, deviation value evaluation circuitry 220 receives a second decoder noise power estimate based on a second channel estimate from decoder noise power estimation circuitry 210 through communication link 214. Deviation value evaluation circuitry 220 determines which channel estimate corresponds to the decoder noise estimate that has the least deviation from the measured decoder noise power. In some implementations, deviation value evaluation circuitry 220 may determine which channel estimate corresponds to the smallest channel estimation error.

In some implementations, deviation value evaluation circuitry 220 receives a single decoder noise power estimate based on a channel estimate from decoder noise power estimation circuitry 210 through communication link 214. Deviation value evaluation circuitry 220 determines if the channel estimate corresponds to a deviation value or a channel estimation error that is less that a threshold value. The threshold value may be pre-determined or automatically determined by decoder noise power estimation circuitry 100.

In some embodiments, deviation value evaluation circuitry 220 provides the computed decoder noise power estimate corresponding to the channel estimate with the least deviation or channel estimation error to utilization circuitry. In some embodiments, deviation value evaluation circuitry 220 provides the computed decoder noise power estimate corresponding to the channel estimate with the least deviation or channel estimation error to decoder noise power estimate computation circuitry 160 for computing the decoder noise power estimate of the received signal.

Figure 3:
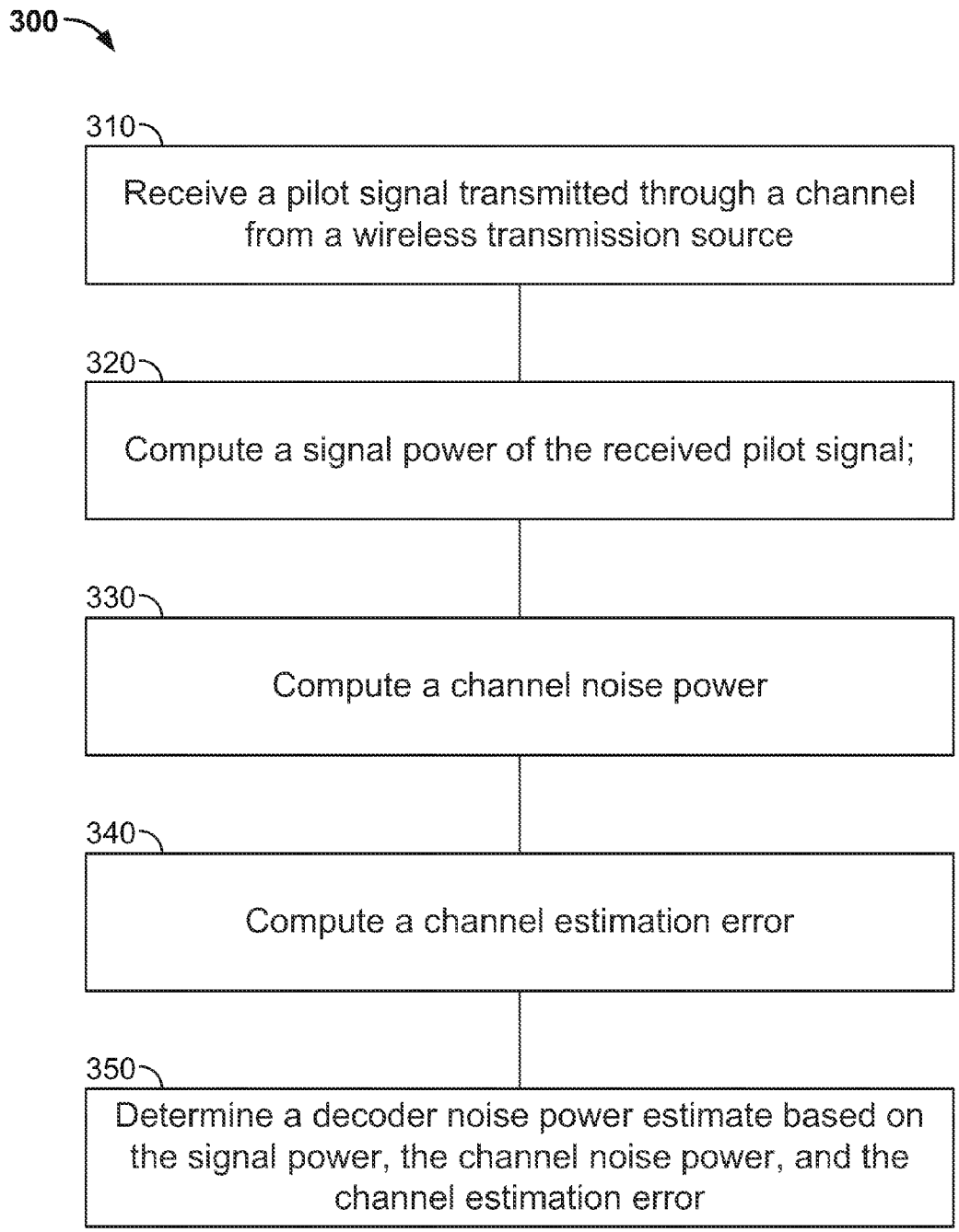
FIG. 3 is an illustrative flow diagram for performing decoder noise power estimation in accordance with embodiments of the present disclosure.

FIG. 3 is an illustrative flow diagram 300 for performing decoder noise power estimation in accordance with embodiments of the present disclosure. At 310, a pilot signal transmitted through a channel from a wireless transmission source is received. For example, receiver circuitry 110 receives an OFDM pilot signal using one or more antennas 114 (FIG. 1).

At 320, a signal power of the received pilot signal is computed. For example, signal power computation circuitry 120 receives the received pilot signal from receiver circuitry 110 and computes a signal power of the received pilot signal (FIG. 1).

At 330, a channel noise power is computed. For example, channel noise power computation circuitry 130 receives the received pilot signal from receiver circuitry 110 and computes a channel noise power (FIG. 1).

At 340, a channel estimation error is computed. For example, channel estimation error computation circuitry 140 receives the received pilot signal from receiver circuitry 110 and computes a channel estimation error (FIG. 1).

At 350, the decoder noise power estimate of the received signal is determined based on the computed signal power, channel noise power, and channel estimation error. For example, channel estimate selection circuitry 150 may receive the signal power, channel noise power, and channel estimation error from circuitries 120, 130, and 140 (FIG. 1). Channel estimate selection circuitry 150 may compute a first decoder noise power estimate value based on values of the signal power, channel noise power, and channel estimation error corresponding to a first channel estimate. Channel estimate selection circuitry 150 may compute a second decoder noise power estimate value based on values of the signal power, channel noise power, and channel estimation error corresponding to a second channel estimate. Channel estimate selection circuitry 150 may determine whether the first or the second estimates indicate less deviation from a measured decoder noise power or the least channel estimation error. Channel estimate selection circuitry 150 may accordingly select the signal power, channel noise power, and channel estimation error values of the channel estimate corresponding to the smaller deviation value or channel estimation error to decoder noise power estimate computation circuitry 160 for further processing.

The above steps of the flow diagram of FIG. 3 may be executed or performed in any order or sequence not limited to the order and sequence shown and described in the figure. Also, some of the above steps of the flow diagram of FIG. 3 may be executed or performed substantially simultaneously where appropriate or in parallel to reduce latency and processing times.

The above described embodiments of the present disclosure are presented for purposes of illustration and not of limitation, and the present disclosure is limited only by the claims which follow.

What is claimed is:

1. A method, comprising:
receiving a signal transmitted through a channel;
determining a channel noise power and a channel estimation error associated with the channel; and
estimating a decoder noise power based at least in part on the received signal, the channel noise power, and the channel estimation error, wherein the estimated decoder noise power is different from the channel noise power.

2. The method of claim 1, further comprising determining a channel estimate based on a signal power of the signal, the channel noise power, and the channel estimation error, wherein the estimating the decoder noise power is based on the channel estimate.

3. The method of claim 1, wherein the channel is a wireless channel, and the signal is a pilot signal that is transmitted through the wireless channel from a wireless transmission source.

4. The method of claim 1, wherein the signal is an orthogonal frequency division multiplexing (OFDM) signal transmitted at regular time intervals.

5. The method of claim 1, further comprising determining a plurality of channel estimation errors in a plurality of domains, wherein estimating the decoder noise power is based on one of the plurality of channel estimation errors that indicates a smaller deviation from a measured decoder noise power.

6. The method of claim 1, further comprising:
determining a plurality of channel estimation errors;
determining a plurality of estimates of the decoder noise power based on the plurality of channel estimation errors; and
comparing each estimate of the decoder noise power to a measured decoder noise power.

7. The method of claim 6, wherein:
the comparing each estimate of the decoder noise power to the measured decoder noise power results in a respective deviation value for each estimate; and
the estimating the decoder noise power comprises selecting, as the estimate of the decoder noise power, the estimate corresponding to a respective deviation value that is below a threshold.

8. The method of claim 1, wherein estimating the decoder noise power comprises:

normalizing the channel estimation error by a signal power of the signal to obtain a normalized channel estimation error; and summing the channel noise power and the normalized channel estimation error.

9. The method of claim 1, wherein the channel noise power is representative of noise, interference, or both on the channel.

10. A non-transitory computer-readable medium storing computer-executable instructions that, when executed by at least one computer processor, causes a computer system to perform a method, the method comprising:

detecting a signal transmitted through a channel;

determining a channel noise power and a channel estimation error associated with the channel; and estimating a decoder noise power based at least in part on the received signal, the channel noise power, and the channel estimation error, wherein the estimated decoder noise power is different from the channel noise power.

11. The non-transitory computer-readable medium of claim 10, wherein the method further comprises determining a channel estimate based on a signal power of the signal, the channel noise power, and the channel estimation error, wherein the estimating the decoder noise power is based on the channel estimate.

12. The non-transitory computer-readable medium of claim 10, wherein the method further comprises determining a plurality of channel estimation errors in a plurality of domains, wherein estimating the decoder noise power is based on one of the plurality of channel estimation errors that indicates a smaller deviation from a measured decoder noise power.

13. The non-transitory computer-readable medium of claim 10, wherein the method further comprises:

determining a plurality of channel estimation errors;

determining a plurality of estimates of the decoder noise power based on the plurality of channel estimation errors; and comparing each estimate of the decoder noise power to a measured decoder noise power.

14. The non-transitory computer-readable medium of claim 13, wherein:

the comparing each estimate of the decoder noise power to the measured decoder noise power results in a respective deviation value for each estimate; and the estimating the decoder noise power comprises selecting, as the estimate of the decoder noise power, the estimate corresponding to a respective deviation value that is below a threshold.

15. The non-transitory computer-readable medium of claim 10, wherein estimating the decoder noise power comprises:

normalizing the channel estimation error by a signal power of the signal to obtain a normalized channel estimation error; and summing the channel noise power and the normalized channel estimation error.

16. An apparatus, comprising circuitry configured to receive a signal transmitted through a channel;

determine a channel noise power and a channel estimation error associated with the channel; and estimate a decoder noise power based at least in part on the received signal, the channel noise power, and the channel estimation error, wherein the estimated decoder noise power is different from the channel noise power.

17. The apparatus of claim 16, wherein the circuitry is further configured to determine a channel estimate based on a signal power of the signal, the channel noise power, and the channel estimation error, wherein the estimating the decoder noise power is based on the channel estimate.

18. The apparatus of claim 16, wherein the circuitry is further configured to determine a plurality of channel estimation errors in a plurality of domains, wherein estimating the decoder noise power is based on one of the plurality of channel estimation errors that indicates a smaller deviation from a measured decoder noise power.

19. The apparatus of claim 16, wherein the circuitry is further configured to:

determine a plurality of channel estimation errors;

determine a plurality of estimates of the decoder noise power based on the plurality of channel estimation errors;

compare each estimate of the decoder noise power to a measured decoder noise power to obtain a respective deviation value for each estimate, by selecting, as the estimate of the decoder noise power, the estimate corresponding to a respective deviation value that is below a threshold.

20. The apparatus of claim 16, wherein the circuitry estimates the decoder noise power by:

normalizing the channel estimation error by a signal power of the signal to obtain a normalized channel estimation error; and summing the channel noise power and the normalized channel estimation error.

* * * * *